(12) United States Patent
Vincent et al.

(10) Patent No.: US 12,051,009 B2
(45) Date of Patent: Jul. 30, 2024

(54) AUTOMATIC AND SELF-OPTIMIZED DETERMINATION OF EXECUTION PARAMETERS OF A SOFTWARE APPLICATION ON AN INFORMATION PROCESSING PLATFORM

(71) Applicant: BULL SAS, Les Clayes sous Bois (FR)

(72) Inventors: Lionel Vincent, Fontaine (FR); Trong-Ton Pham, Grenoble (FR); Gaël Goret, La Murette (FR); Philippe Couvee, Villard Bonnot (FR); Mamady Nabe, Saint Martin d'Heres (FR)

(73) Assignee: BULL SAS, Les Clayes sous Bois (FR)

( * ) Notice: Subject to any disclaimer, the term of this patent is extended or adjusted under 35 U.S.C. 154(b) by 964 days.

(21) Appl. No.: 16/450,714

(22) Filed: Jun. 24, 2019

(65) Prior Publication Data

US 2019/0392331 A1 Dec. 26, 2019

(30) Foreign Application Priority Data

Jun. 26, 2018 (FR) ...................................... 1855720

(51) Int. Cl.
*G06F 11/30* (2006.01)
*G06F 11/34* (2006.01)
(Continued)

(52) U.S. Cl.
CPC ........... *G06N 5/04* (2013.01); *G06F 11/3466* (2013.01); *G06F 17/18* (2013.01)

(58) Field of Classification Search
CPC ...................................................... G06F 17/18
See application file for complete search history.

(56) References Cited

U.S. PATENT DOCUMENTS 6,394,242 B1 * 5/2002 Allaei .................. E04H 9/0235
267/136
9,348,742 B1 * 5/2016 Brezinski .............. G06F 21/566
(Continued)

FOREIGN PATENT DOCUMENTS

FR 1855720 6/2019

OTHER PUBLICATIONS

N. Liu, J. Cope, P. Carns, C. Carothers, R. Ross, G. Grider, A. Crume and C. Maltzahn. "On the role of burst buffers in leadership-class storage systems,", in IEEE 28th Symposium on Mass Storage Systems and Technology (MSST), 2012.
(Continued)

*Primary Examiner* — Jae U Jeon
(74) *Attorney, Agent, or Firm* — MEAGHER EMANUEL LAKS GOLDBERG & LIAO, LLP

(57) ABSTRACT

The invention relates to a method for optimizing the execution parameters of a software application on an information processing platform, consisting in iteratively optimizing said parameters at each execution of said application, in which:
for each execution (1) of said application, performance measurements are made (2) and stored (3), in association with the parameters used for said execution;
at the start of each execution of said application, values are determined (4, 6) for a first subset of said parameters by inference (6) from the stored measurements corresponding to a subset of the executions corresponding to a second subset of said parameters.

7 Claims, 3 Drawing Sheets

(51) Int. Cl.
*G06F 17/18* (2006.01)
*G06N 5/04* (2023.01)

(56) References Cited

U.S. PATENT DOCUMENTS

| | | | | |
|---|---|---|---|---|
| 10,552,173 | B2* | 2/2020 | Chhabbi | G06F 9/4411 |
| 10,846,057 | B2* | 11/2020 | Howard | G06F 8/10 |
| 2004/0078779 | A1* | 4/2004 | Dutt | G06F 8/456 |
| | | | | 717/130 |
| 2006/0242130 | A1* | 10/2006 | Sadri | G06F 16/951 |
| 2008/0027948 | A1* | 1/2008 | Corley | G06F 11/3495 |
| 2011/0231167 | A1* | 9/2011 | Cramer | G03F 7/70641 |
| | | | | 703/2 |
| 2012/0174653 | A1* | 7/2012 | Ikawa | F01N 9/002 |
| | | | | 73/23.33 |
| 2013/0055264 | A1* | 2/2013 | Burr | G06Q 10/10 |
| | | | | 718/100 |
| 2013/0060125 | A1* | 3/2013 | Zeman | A61B 5/374 |
| | | | | 600/409 |
| 2014/0100952 | A1* | 4/2014 | Bart | G06Q 30/0264 |
| | | | | 705/14.53 |
| 2014/0337429 | A1* | 11/2014 | Asenjo | H04L 67/10 |
| | | | | 709/204 |
| 2016/0103903 | A1* | 4/2016 | Vivalda | H04L 65/403 |
| | | | | 709/204 |
| 2017/0142649 | A1* | 5/2017 | El-Moussa | H04W 48/20 |

OTHER PUBLICATIONS

M. Mesnier, G.R. Ganger, and E. Riedel. "Object-based storage", in IEEE Communications Magazine, 41(8): 84-90, 2003, or DAOS, described, for example, in Breitenfeld, M. Scot, et al. "DAOS for Extreme-Scale Systems in Scientific Applications", in arXiv preprint arXiv: 1712.00423, 2017.

\* cited by examiner

AUTOMATIC AND SELF-OPTIMIZED DETERMINATION OF EXECUTION PARAMETERS OF A SOFTWARE APPLICATION ON AN INFORMATION PROCESSING PLATFORM

CROSS-REFERENCE TO RELATED APPLICATIONS

This application claims priority to French Patent Application No. 1855720 filed on Jun. 26, 2018 with the French Patent Office, the disclosure of which is incorporated herein by reference in its entirety.

FIELD OF THE INVENTION

The invention relates to the field of optimizing software application executions on information processing platforms.

It is particularly applicable to the field of high performance computing and supercomputers and notably their evolution towards "exascale".

CONTEXT OF THE INVENTION

The evolution in size and the increasing complexity of current information processing platforms already involve a paradigm shift in their use and administration. Indeed, increasingly, human intervention is proving difficult given the amount of information involved in maintaining an optimal operating state.

In addition, future exascale computers, i.e. those aiming at a power of the order of an exaflop, will incorporate a much higher number of computing nodes, and the methods of accessing the current data of POSIX parallel file type systems involving high data consistency and the scaling of which is quite limited, will no longer be usable.

There are alternative solutions. Some seek to extend the POSIX model: technologies of the "burst buffers" type may notably be cited, as described in N. Liu, J. Cope, P. Cams, C. Carothers, R. Ross, G. Grider, A. Crume and C. Maltzahn. "On the role of burst buffers in leadership-class storage systems,", in IEEE 28th Symposium on Mass Storage Systems and Technology (MSST), 2012.

Other solutions provide other access models, such as that of object storage, described, for example, in M. Mesnier, G. R. Ganger, and E. Riedel. "Object-based storage", in IEEE Communications Magazine, 41(8): 84-90, 2003, or DAOS, described, for example, in Breitenfeld, M. Scot, et al. "DAOS for Extreme-Scale Systems in Scientific Applications", in arXiv preprint arXiv: 1712.00423, 2017.

However, these alternative solutions involve an implementation on demand, with specific parameters suited to the behaviour of the applications for which they will be instantiated. The state of the art today is that this parameterization is entirely manual, dependent on users who only very rarely have the skills to define it.

To make this automation possible, it will therefore be essential to have a very thorough understanding of the behaviour of the applications, in order to apply the most relevant input-output acceleration strategies, and thus contribute to the optimization of the supercomputer's operation.

SUMMARY OF THE INVENTION

The object of the present invention is to provide a method that at least partially remedies the aforementioned drawbacks.

In particular, the invention enables to be agnostic on any knowledges regarding the applications and their behaviours, and to not base on a priori information. As the applications to handle may be very heterogeneous in their behaviour, it may be very complex to model their particular behaviours. The invention uses then a black-box type of mechanism and allows then easier usages and a wider application range.

More particularly, the invention is aimed at providing an optimization of the execution of software applications which is automated, i.e. which minimizes, or even makes human intervention non-essential in the parameterization of the execution of the application.

To this end, the present invention provides a method for optimizing the execution parameters of a software application on an information processing platform, consisting in iteratively optimizing said parameters at each execution of said application, in which for each execution of said application, performance measurements are made and stored, in association with the parameters used for said execution;

at the start of each execution of said application, values are determined for a first subset of said parameters by inference from the stored measurements corresponding to a subset of the executions corresponding to a second subset of said parameters.

According to preferred embodiments, the invention comprises one or more of the following features which may be used separately or in partial combination therebetween or in total combination therebetween:

said first subset of parameters corresponds to optimization parameters of the input/output interfaces associated with said software application;

said first subset of parameters corresponds to configuration parameters of a software module for optimizing the inputs/outputs of said software application;

said second subset is formed by a discriminant parameter such as an application identifier;

said subset of executions is in addition determined by an outlier data filter;

a datum is regarded as an outlier when it concerns a performance measurement value representative of a different behaviour from the other values of said performance measurement for said subset of executions;

an outlier datum is determined by pairwise comparisons between the data relating to said executions of said subset;

regression mechanisms (linear or non-linear) are implemented for said inference.

Another aspect of the invention relates to a device for optimizing the execution parameters of a software application (i.e., instructions for configuring a processor) on an information processing platform (e.g., a processor coupled to a non-transitory computer-readable storage medium), the instructions defining software modules for implementing the method as previously described.

Another aspect of the invention relates to a computer program comprising software means suitable for implementing the method as previously described, when triggered by an information processing platform.

Other features and advantages of the invention will appear on reading the following description of a preferred embodiment of the invention, given by way of example and with reference to the appended drawings.

DETAILED DESCRIPTION OF THE INVENTION

Figure 1:
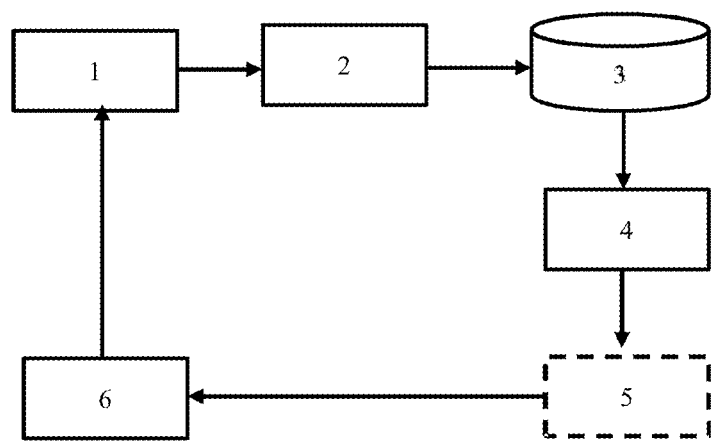
FIG. 1 schematically and functionally represents the optimization loop according to an embodiment of the invention, FIGS. 2a and 2b schematically represent the test results according to an embodiment of the invention.

In what follows, "job" will refer to an abstract representation consisting of a set of metadata defining the modalities of execution of an application on an information processing platform. These metadata notably comprise:

An application identifier (name of the executable binary, information originating from the application execution tool on a supercomputer, accessed files, etc.)

The hardware topology used (computation and storage)

Parameters of the execution context, and in particular the optimization parameters of the input-output interfaces associated with this software application.

For a given "job", two executions (or "runs") will give different behaviours, which may be related to concurrent accesses to the data, to the use of processing resources by other application executions, etc.

According to the invention, it is sought to automatically optimize a portion of the metadata of a job for its execution. This optimization takes place according to a predetermined criterion expressed by one or more performance measurements.

The optimal solution corresponds to a situation where the performance value of an objective function is minimum or maximum (optimum) associated with a predetermined criterion. For example, in the case of a high-performance (or HPC for "High Performance Computing") application, a good example of a performance criterion to be minimized is the total execution time.

When a user launches a job, they may choose not to fix all the metadata corresponding to the definition of their job, and to leave some of them free.

In a typical case the user wishes to launch a specific application: the metadatum "application identifier" is therefore fixed.

On the other hand, if they have no idea a priori of the hardware topology to use, the hardware topology metadata may be left free. Similarly, if they have no idea regarding the configuration of the input-output interfaces suited to the context, the optimization parameters of the input-output interfaces are left free.

The method of self-optimization then provides the user with values for the parameters thus left free, which should make it possible to improve the execution of the application, compared to an arbitrary fixing of these parameters.

The invention is based on the principle that it is not possible, or not efficient enough, to seek to model the behaviour of a job a priori. It is therefore aimed at taking measurements in order to observe a posteriori the behaviour of a set of executions which describe, or characterize, the job as a "family."

An application family corresponds to a set of executions which have metadata in common. For example, all the executions derived from jobs having the same application name and the same hardware deployment topology form a family.

Thus during observation, the family offers making space available for the free parameters. The more numerous the executions the more the space for the values taken by the free parameters is representative of the variation in the performance value for the family concerned.

Searching for the optimal values for the free parameters is an iterative process. Each iteration enriches the knowledge of the features of the different families as a whole.

Also, in order to scan the parameter space efficiently (i.e. non-exhaustively), searching for an optimum may be performed at the launch of each new execution. This optimum is probably not global, but this "local" solution may then be reinvested in a new inference of the free parameters for the next iteration and the next job execution of this family.

Thus, the fact of performing an inference at each iteration makes it possible to create a loop of continuous improvement and a convergence towards the global optimum.

FIG. 1 depicts the optimization loop.

Initially, in step 1, the application is executed with execution parameters.

These execution parameters comprise parameters fixed by the user. These fixed parameters may notably comprise a discriminant parameter such as the identifier of the application to be executed, but other parameters may also be fixed such as, for example, the configuration of the topology of the underlying infrastructure.

The execution parameters also comprise free parameters, the value of which it is sought to optimize. These free parameters may be determined by inference from the measurements stored in a base 2 for subsequent iterations. During the first iteration, the values may be fixed by the user or else determined by other means, including randomly or on the basis of "default" values.

According to one aspect of the invention, the choice between fixed and free metadata (parameters) is up to the user. The invention is then aimed at optimizing the values of the parameters that the user did not wish to fix themselves.

According to the invention, all or part of the executions (or jobs) are monitored. Performance measurements are performed, in step 2, and the results are stored in a base 3 in association with the parameters used for the execution in question.

These performance measurements may be performed in real time during the execution of the job, or a posteriori, once the job is completed. These measurements may comprise an execution time, a number of inputs-outputs, a time spent on inputs-outputs, etc.

The database 3 is structured so that the performance measurements are associated with the values of execution parameters (fixed and free). The data therefore comprise both performance measurements and metadata associated with the jobs.

In a step 4, the data stored in the base 3 are used in performing an extraction based on the fixed metadata (or parameters). The result is a data subset (performance measurements, metadata) relating to the executions corresponding to the fixed metadata, or, in other words, corresponding to the family of the job that the user wishes to execute. This subset is therefore relevant to performing inference of the free parameters.

In a step 6, these free parameters are inferred from the performance measurement values corresponding to the previously extracted subset.

In order to produce the most effective inference possible, it may be useful to preferentially use the most relevant executions within the family considered. Indeed, some embodiments may be considered as outliers because of their dissimilarities with the rest of the executions of their family.

This selection, or filtering, may be performed in an optional step 5, inserted between extraction 4 of the data of a family and inference 6.

Inference is aimed at providing values for the free parameters corresponding to the best solution on the basis of the knowledge acquired until this iteration. This is a local optimum, which will converge as the iterations are performed towards a global optimum.

Various mechanisms are possible for implementing inference, some of which are accessible to the person skilled in the art.

In particular, inference may be implemented by linear or non-linear regression mechanisms. These mechanisms will be detailed in an embodiment applied to the parameters of executions relating to the inputs-outputs, but they may be generally applicable to other types of execution parameters.

Embodiment for Optimizing Input-Output Parameters

According to one embodiment, the free parameters correspond, at least in part, to optimization parameters of the input-output interfaces associated with the software application in question.

In some situations, software modules for optimizing inputs-outputs may be used (or "accelerators"). According to one embodiment, the free parameters may then correspond to configuration parameters (or to the parameters) of these software modules.

HPC applications devote a major portion of their execution time to performing inputs/outputs. The volumes of data which are processed represent in themselves the main cause: the networks used for exchanging data having a finite bandwidth, the read and write times may not be less than a theoretical minimum. However, other factors may have a significant impact. For example, the concurrent execution of two applications may cause access conflicts to common storage resources which will affect performance. The way in which an application performs its inputs/outputs may also affect performance dramatically in the event that it saturates storage equipment by requiring the processing of a very large number of "small" operations.

According to one embodiment, a device is put in place for monitoring executed applications dedicated to the profiling of access to data by High Performance Computing (HPC) applications. This makes it possible to record in real time numerous metrics relating to the progress of the execution of programs on the HPC cluster (IO volume, IO times, number of active processes, etc.). The set of the collected metrics gives a description of the dynamic behaviour of the applications, which forms a solid basis for the development of automatic parameterization methods.

In the embodiment described below, it is considered that only free parameters relating to the input-output interface are to be inferred.

In such a case, the filter 4 aggregates all the executions which have the same discriminant (same application identifier) and the same topology as the job that is to be launched. This step will not be detailed here since it simply consists in selecting executions by querying the fixed metadata in the database 3.

The steps of classification 5 and inference 6 are more particularly detailed.

The step of classification 5 is aimed at detecting the executions that are not relevant to the step of inference 6. Two main causes may lead to the exclusion of an execution in this step.

input-output (I/O) behaviour is very different compared to the other executions of the same family. It is then classified as an outlier, the input-output, I/O, behaviour of a subset of executions slowly diverges from the initial stable behaviour. The job in which this set of executions diverges is then characterized as unstable (it may be an application under development, slow change in hardware performance, etc.).

To detect these outlier executions that must be excluded before inference, the phase of classification uses all the available data regarding their I/O behaviour.

These data, representative of the IO behaviour, are the set of the collected metrics.

One classification method provided is based on a pairwise comparison of all the executions belonging to the same family. Thus, for each execution pair, the collected measurements are compared by using the statistical methods described later in the document. This comparison results in as many distances as performance measurements per pair of compared executions, which are then aggregated to obtain a unique distance between two executions.

Finally, a matrix of distances N×N, relative to the comparison of all the N executions therebetween, makes it possible to create a hierarchical classification.

The collected measurements represent the evolution over time (per 5-second slot, for example) of the IO behaviour of an execution through the prism of a feature (e.g. read volume, write times of sizes between 1 Mb and 4 Mb, etc.). Each of the measurements may therefore correspond to a sequence of values evolving over time.

In a conventional approach to classification, scalar features could be extracted from the measurement sequences. This would then make it possible to calculate a distance between the feature vectors of different executions, since all the feature vectors have the same dimension (i.e. the number of extracted features).

Conversely, in the approach that has been chosen for classifying the executions, it has been opted to compare sequences directly 2 by 2. However, executions do not necessarily exhibit similar total durations. This requires formatting the sequences so that they are comparable by statistical methods (described later in the document) accepting this format.

The use of "goodness-of-fit" non-parametric hypotheses tests is a good means of comparing two samples. The Kolmogorov-Smirnov and Cramer-von Mises tests are good candidates for this purpose and will be detailed later in the document. These two tests use the same formatting of compared samples: a Cumulative Distribution Function (CDF).

Figure 2A:
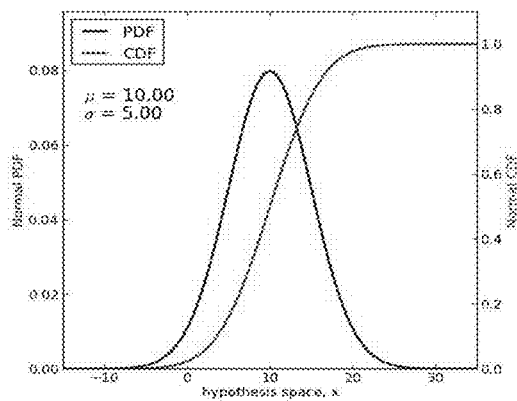
Figure 2B:
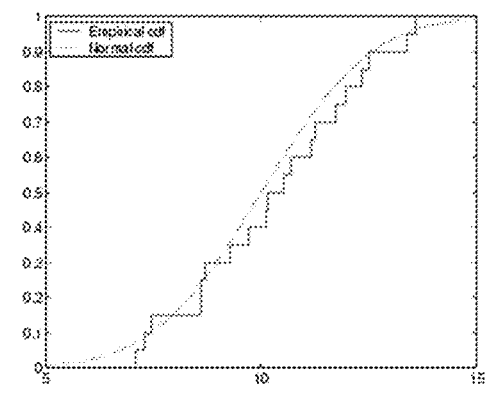

FIG. 2a depicts the PDF (probability density function) and CDF of the normal law, the CDF therefore being the cumulative version of the PDF. Note that a CDF is increasing and bounded between 0 and 1. FIG. 2b depicts the difference between a CDF and an empirical CDF which is a discrete instance representing a sample from the continuous law.

Based on the sequences of IO measurements, two ways of representing the data of these sequences may be extracted in the form of empirical CDFs.

"Temporal" CDF

An empirical CDF corresponds to the cumulative version of a normalized histogram (i.e. an empirical PDF). This format particularly echoes the way in which the IO measurements are collected. Indeed, per 5-second slot, the events associated with each measurement are integrated, thus forming a histogram where each "bin" interval would be a 5-second time slot.

Note that in the rest of the document, empirical CDF will be referred to simply as CDF by misnomer, since the data considered are always derived from samples.

Figure 3A:
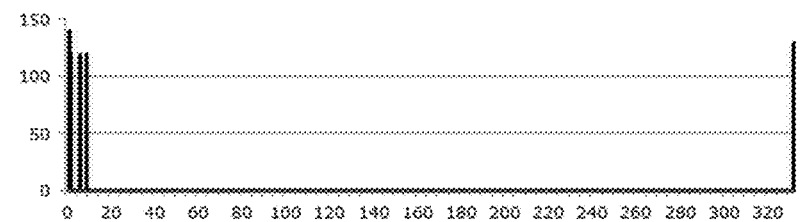
FIGS. 3a and 3b schematically illustrate examples according to an embodiment of the invention.

FIG. 3a represents a sequence of data for measuring "active IO processes".

Figure 3B:
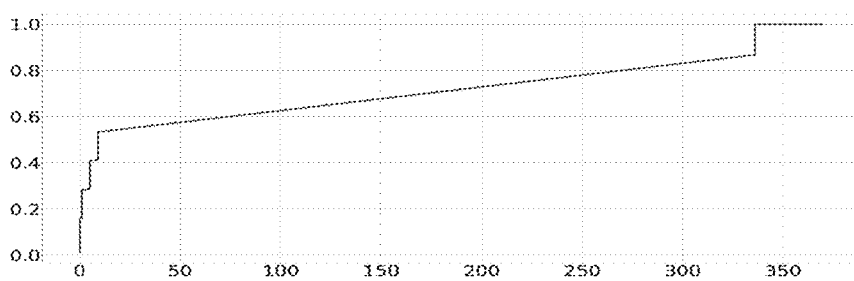

FIG. 3b illustrates the CDF corresponding to the sequence previously described. Using this representation, it will be seen later that a distance may be obtained between the sequences of a measurement for different jobs.

"Value" CDF

A more conventional way of representing the data of a sequence is to consider it as a single sample, for which the order of the data does not matter. In this case, the CDF represents the distribution of the values contained in the sequence.

Figure 4:
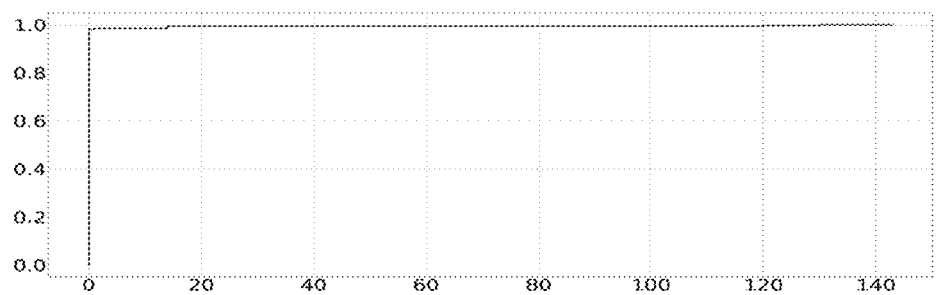
FIGS. 4, 5, 6, 7 and 8 also schematically illustrate different aspects associated with various embodiments of the invention.

FIG. 4 represents the CDF obtained in this case for the original sequence of FIG. 3b.

In this version, it is noted that the temporal aspect of the sequence is no longer retranscribed by the CDF.

Two-by-Two (Pairwise) Comparison

By using the previously described statistical representation (CDF), non-parametric hypothesis tests may be used for comparing two CDFs and thus obtaining a distance between these CDFs.

The Kolmogorov-Smirnov and Cramer-von Mises tests make it possible to compare two samples by using their CDFs.

Kolmogorov-Smirnov Test

The two-sample Kolmogorov-Smirnov test directly compares two data samples to determine whether they are from the same distribution law, regardless of the knowledge of this law.

The test always searches for the maximum distance Ds between two CDFs Fm and Ms, of size n1 and n2 respectively:

$$D_s = \sup_x |F_m(x) - M_s(x)|$$

Figure 5:
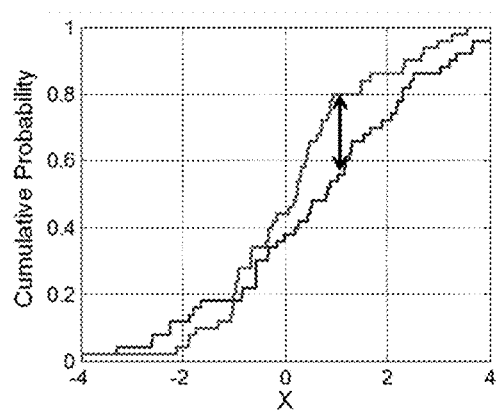

FIG. 5 shows the principle of this two-sample version.

From the statistic Ds, it is possible to calculate the probability ps, termed the p-Value, that the two tested CDFs are from the same distribution law:

$$p_s(\lambda) = 2\sum_{k=1}^{+\infty} (-1)^{k+1} e^{-2k^2\lambda^2}$$

With $\lambda = \sqrt{n} \cdot D_s$ and $n = n_1 \cdot n_2$

Cramér-Von Mises Test

This test, which is known to be an alternative to the Kolmogorov-Smirnov test, tests the same hypothesis according to the same usage procedure. The Cramer-von Mises test differs by the criterion used for generating the statistic Ds. Here where the Kolmogorov-Smirnov test searched for the maximum distance between two CDFs, the Cramer-von Mises test calculates the integral of the difference between the two CDFs.

Ds is calculated by taking into account two empirical CDFs $F_m = \{x1, \ldots xN\}$ and $Ms = \{y1, \ldots, yM\}$ and:

$$D_S = \frac{U}{NM(N+M)} - \frac{4NM-1}{6(N+M)}$$

With U such that:

$$U = N\sum_{i=1}^{N}(r_i - i)^2 + M\sum_{j=1}^{M}(s_j - j)^2$$

with ri and sj respectively the ranks in the combined sample of xi and yj. A probability that the two samples are from the same distribution law is also deduced from the Cramer-von Mises statistic.

It is noted that, the calculation of the Cramer-von Mises statistic requires more calculations than that of the Kolmogorov-Smirnov test.

Distance Calculation

By using one of the previously described tests, a measurement is provided for revealing the distances between two jobs (in reality there are even 4 different possibilities of distance measurements provided: 2× Ds or Ps).

For a set of N jobs, the 2 by 2 comparison of the sequences of a measurement makes it possible to obtain an N×N matrix of the 2 by 2 distances between jobs. Thus, by comparing all the IO measurements collected by the IOI (e.g. 68 different measurements) 68 distance matrices may be obtained, each of dimension N×N.

Hierarchical Classification

The hierarchical classification is an automatic classification method widely used in data analysis. From a set Ω of n individuals, its purpose is to distribute these individuals into a certain number of classes. The hierarchical qualifier comes from the fact that it produces a hierarchy H, the set of the classes at all the steps of the algorithm, which satisfies the following properties:

Ω∈H: at the top of the hierarchy when it is grouped so as to obtain a single class, all individuals are grouped together ∀ω∈Ω, {ω}∈H: at the bottom of the hierarchy, all individuals are alone ∀(h, h')∈H2, then h∩h'=∅ or h ⊂h' or h'⊂h: if two classes of the hierarchical grouping are considered, then either they do not share individuals in common, or they include one in the other (or vice versa)

The method assumes that there is a measurement of similarity (or dissimilarity) between all the individuals. From there, two ways of proceeding are possible:

The ascendant (or agglomerative) hierarchical classification (AHC) which presupposes a situation where all individuals are alone in a class, then are gathered into increasingly large classes The descendant hierarchical classification (DHC), on the contrary, starts from a single class containing all the individuals, for iteratively dividing this initial group into a growing number of classes until all the individuals are isolated.

Figure 6:
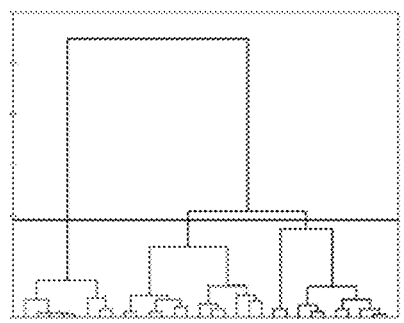

A dendrogram is a graphical representation of a hierarchical classification. It is often depicted as a binary tree the leaves of which are the individuals aligned on the abscissa axis. When two classes or two individuals meet, vertical lines are drawn from the abscissa of the two classes up to the ordinate, then they are connected by a horizontal segment. FIG. 6 depicts an example of a dendrogram which, for the chosen threshold (horizontal line) makes it possible to identify 3 classes.

The dendrogram is constructed from the distance matrix which contains the 2 by 2 distances of the N elements to be classified. The distances between the elements are marked on the dendrogram by the length of the branches which connect two nodes. Thus the distance between two elements (i.e. leaves) is represented by the vertical distance between the level of the leaves and the node which connects the two leaves.

Aggregation of the Distance Matrices

In the present case, there are 68 distance matrices (or more generally, as many collected performance measurements), each containing the distances between 2 by 2 jobs for a particular metric. In order to construct a dendrogram for classifying the set of jobs, the distance matrices must be aggregated according to the measurements in order to obtain a single one which will contain the "total" distances between jobs.

The aggregation of the distance matrices that have been chosen to show the classification results in the next section is a simple sum of the 68 distance matrices. However, with suitable skilled knowledge, the aggregation phase may be the opportunity to use only certain measurements and/or to weight the most relevant.

Classification

Figure 7:
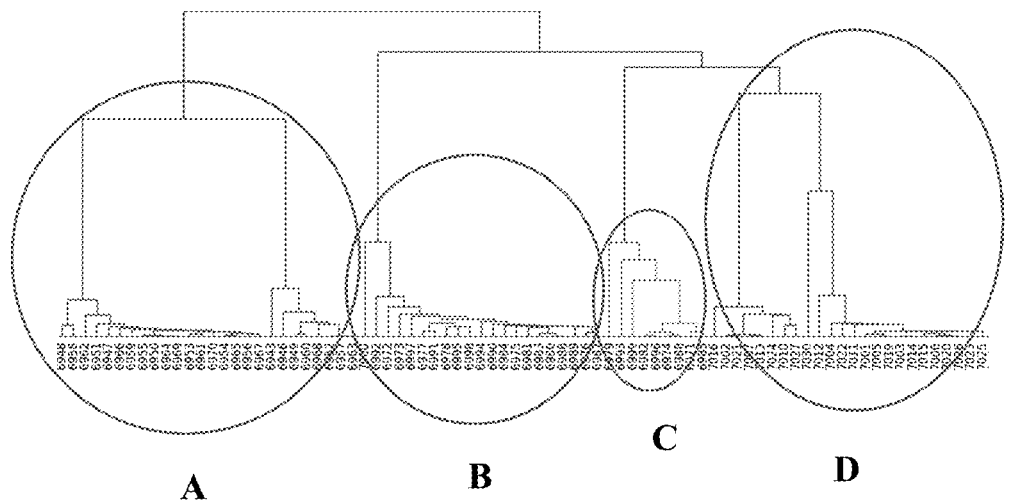

Once the "total" distance matrix has been generated, the jobs may be classified using a hierarchical classification method. FIG. 7 depicts the result of a classification of 90 executions, using the distance measurement between previously described jobs.

The set of these executions was generated from 3 different jobs. However, the dendrogram in FIG. 7 reveals 4 different classes (A, B, C, D). By analysing this result, it has been identified that the classes C and D both contain the executions from a single job. The separation into two classes of this set of executions may be explained by the choice of the threshold that was used (black line).

A slightly higher threshold would have made it possible to consider the two classes C and D as a single one. Similarly, a slightly lower threshold would have led to identifying 5 classes.

One of the difficulties in using these hierarchical classification methods is therefore the choice of this threshold, since it has a great influence on the number of classes ultimately identified. One generally adopted solution consists in setting the value of the threshold relative to the maximum distance between two elements (e.g. 70% of the maximum distance). But in the case where the elements of the classes have heterogeneous distances (e.g. the class D vs. class B) it is difficult to find a threshold that makes it possible to properly classify the elements.

However, this difficulty is less for the present usage case which focuses on the detection of outlier data. Indeed, the set of the executions used in the classification are, de facto, from one job family and they should therefore all be grouped into a single class. The outlier executions are therefore easily identifiable with a relative threshold, based, for example, on the average or median distance between all the executions.

The method of classification of executions that has been described makes it possible to identify outlier executions in a set of executions from the same job family.

For this, the distances between executions are calculated from the distances between the sequences of collected IO measurements. The measurement sequences are compared based on statistical tests, then the distances are aggregated for the set of the compared measurements in order to obtain the total distance between the executions. The generated distance matrix makes it possible to classify the executions according to a hierarchical method of classification, the outlier executions being detected based on a relative threshold.

This detection of outlier executions makes it possible to only select the relevant executions for the metadata inference phase.

Metadata Inference

At the launch of a new execution, some metadata is chosen to be left free, for which the optimal values will be inferred.

By filtering into a family and classification, a set of executions is selected relevant for inference as previously described. For each of these executions, the set of the useful data is extracted for inference of the free metadata.

In the set of these data, some variables are termed dependent (explained), others, on the other hand, are independent (explanatory) variables. By nature, the metadata that it is sought to infer are independent variables. It is assumed that there is a relationship between the dependent and independent variables. The principle of regression is to construct a model that describes this relationship.

Once the model is obtained by regression, the search for the optimal parameters to be applied to a system may be performed by using optimization algorithms.

For the present usage case, it is sought to infer the optimal parameters of an input/output accelerator with respect to a performance measurement.

Figure 8:
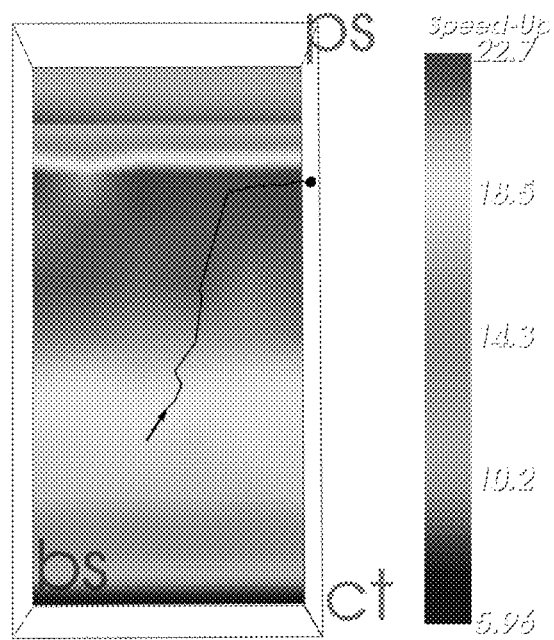

FIG. 8 depicts the optimization of 3 "Fast IO Libraries" parameters on the maximization criterion of the speed-up. The speed-up field here is generated by the interpolation of a set of performance measurements for a large number of executions launched by a test application. The values of the optimized Fast IO Libraries parameters are as follows:

SRO_CLUSTER_THRESHOLD (ct)
SRO_DSC_BINSIZE (bs)
SRO_PREFETCH_SIZE (ps)

In this application, the function that serves as a criterion in determining the best solution of the optimization problem (objective function) is obtained by the interpolation of the field of the sampled speed-ups (264 collected measurements).

In a production context, i.e. when the performance value of an application cannot be conscientiously assessed in a large number of points, a multiple regression step must be added for modelling the parametric space as a continuous function. This may then, advantageously, serve as an objective function for the optimization method. This is what will be detailed in the next section.

Modelling the Variation in Performance by Regression

The regression process makes it possible to obtain a continuous model which models the variation in performance (e.g. the execution time of the application) as a function of the accelerator parameters.

It is possible to categorize regression techniques according to the type of relationship (e.g. linear or non-linear), the number of independent variables (e.g. single or multiple), and the number of dependent variables (e.g. univariate or multivariate).

In the present usage case, it is sought to determine multiple accelerator parameters with respect to the performance value. It is therefore a multiple, univariate regression.

In a concrete application of inference of the SRO module parameters of the "Fast IO Libraries", several methods have been the subject of experimentation:

Linear Regression Method: Bayesian Ridge Regression (BRR)

BRR is a simple linear regression technique using L-2 type regularization.

It has the advantage of providing a simple and explanatory model, but it does not well express the relationship which exists between the various parameters and the performance measurement.

To better reflect the inherent complexity of the parameterization problem, there are advanced methods which make it possible to take into account the aspects of non-linear dependence between the variables.

Non-linear Regression Methods Based on the Kernel Technique

The methods based on the kernel technique make it possible to transform a non-linear problem in the starting space, into a linear problem in the arrival space. Since the transformation operator is difficult to determine at any point, the method integrates the kernel technique ("kernel methods"). This uses the properties of the arrival space by establishing a similarity measurement for two points. There are different types of kernels (e.g. "radial basis function", polynomial, linear, exponential, etc.).

The "Support Vector for Regression" (SVR) method is a "Kernel" variant of the Support Vector Machine (SVM) for regression. It makes it possible to obtain a sparse model based solely on support vectors. This model allows a rapid prediction.

The "Gaussian Process for Regression" (GPR) method is the kernel version of "Bayesian Regression".

It has the advantage of being faster in training, and works well, including in the case of incomplete data.

In assessing these two methods in the present usage case, the "Radial Basis Function" (RBF) kernel was used:

$$K(x, y) = \exp\left(-\frac{1}{2\sigma^2}\|x - y\|^2\right)$$

Unlike the polynomial kernel, which necessitates a priori determining the degree required for the model function, the RBF kernel functions without any a priori assumption.

Whatever the regression method used, a model is arrived at for assessing a performance value, for any value of parameters of the accelerator.

This model allows a search for optimal solutions in a convergence strategy.

Optimization of the Accelerator Parameters

Having estimated a function modelling the relationship between the accelerator parameters and the performance values, it is possible to use optimization algorithms to find optimal parameters.

There are different types of numerical optimization algorithms that can be classified into two groups:

Gradient methods
  These are methods that use the notion of a derivative of the objective function for quickly determining the extrema.
Gradient independent methods
  These are methods which operate without information related to the differentiable character of the objective function.

Several optimization methods have been the subject of experimentation including or not including the calculation of the gradient. For searching parameters, whereof the space often exhibits multiple local optima, gradient independent methods offer further possibilities of converging the global optimum, unlike gradient methods which, in our experiments, are often trapped by local optima.

In a concrete application of inference of the parameters of the SRO module of the "Fast IO Libraries," aimed at minimizing the execution time of an application, several methods have been the subject of experimentation:

Nelder-Mead (NM) Algorithm

The Nelder-Mead method is a non-linear optimization algorithm which seeks to minimize a continuous function in a multidimensional space.

Also known as the "downhill simplex method", the algorithm uses the simplex concept which is a polytope of N+1 vertices in an N-dimensional space. Starting initially from such a simplex, this undergoes simple transformations in the course of iterations: it deforms, moves and is progressively reduced until its vertices approach a point where the function is locally minimal.

"Particle Swarm Optimization" (PSO) Algorithm

Unlike the Nelder-Mead algorithm, the "Particle Swarm Optimization" adopts a stochastic approach, using a multi-agent type of modelling. This method swarms multiple particles in the variable space, which share the assessed values of the objective function at different points, contributing to the global knowledge of the particle swarm.

This sharing of information may take place in two ways: a local one, which limits the exchange to the particles of the near vicinity, another global one, which ensures a preferred sharing between the particle having the best assessment of the objective function and the others.

The strategy of self-optimization of "free" metadata has been illustrated by an embodiment consisting in determining the parameters of an IO accelerator which make it possible to optimize the performance of an application (i.e. minimizing the execution time). The approach chosen consists in using the data collected by the Instrumentation IO on past executions, for inferring optimal parameters. For this, only the relevant executions are selected by, successively, their fixed metadata (step 4) and their temporal IO behaviours (step 5).

This execution set is then used to obtain, by regression, a model of the performance value as a function of the accelerator parameters. Finally, the parameters to be used are determined from the model obtained by optimization methods which optimizes a cost function.

The execution launched with the inferred parameters is itself monitored and the collected data will be used in a subsequent inference. In this way, the executions base increases with successive inferences, at the same time increasing the knowledge of the performance field in the accelerator parameters space. At each iteration, this growing knowledge makes it possible to obtain a regressed model increasingly close to the theoretical model, thus looping in a virtuous circle of self-optimization which converges towards a global optimum for the job considered.

Of course, the present invention is not limited to the examples and to the embodiment described and represented, but lends itself to numerous variants accessible to the person skilled in the art.

The invention claimed is:

1. A method for optimizing parameters for execution of a software application on an information processing platform, the method comprising:
  iteratively optimizing said parameters at each execution of said application,
  wherein said parameters comprise fixed parameters and free parameters,
  wherein for each execution, the method includes, during said execution or once said execution is completed:

making a performance measurement in association with said parameters used for said execution;

creating a stored performance measurement by storing said performance measurement; and wherein at a start of or right before starting each new execution of said application, determining values for a first subset of said parameters by inference from said stored performance measurement corresponding to a subset of previous executions corresponding to a second subset of said parameters, and wherein each parameter of the first subset of said parameters is a free parameter and each parameter of the second subset is a fixed parameter, and wherein said determining comprises inferring optimal values for said first subset of parameters according to a predetermined criterion expressed by said stored performance measurement and from a model describing a relationship between the second and the first subset of parameters, by an optimization method optimizing a cost function, and wherein said first subset of parameters corresponds to configuration parameters of an input/output accelerator software module for optimizing inputs/outputs of said software application, and wherein said model is obtained by regression and continuously models a variation in performance of said software application, as a function of the configuration parameters of said input/output accelerator software module.

2. The method according to claim 1, wherein said second subset is formed by a discriminant parameter such as an application identifier.

3. The method according to claim 1, wherein said subset of executions is in addition determined by an outlier data filter.

4. The method according to claim 3, wherein a datum is regarded as an outlier when it concerns a performance measurement value representative of a different behaviour from other values of said performance measurement for said subset of executions.

5. The method according to claim 4, wherein outlier datum is determined by pairwise comparisons between the data relating to said executions of said subset.

6. A system for optimizing execution parameters of a software application on an information processing platform, comprising:

a processor on an information processing platform;

a non-transitory computer-readable storage medium coupled to the processor, the non-transitory computer-readable storage medium comprising instructions that, when executed, cause the processor to utilize software modules for implementing the method according to claim 1.

7. A non-transitory computer-readable storage medium comprising instructions for configuring a processor to implement the method according to claim 1 when said instructions are triggered by a data processing platform.

* * * * *